(12) United States Patent
VanHooser et al.

(10) Patent No.: US 8,602,452 B1
(45) Date of Patent: Dec. 10, 2013

(54) SEAL RUPTURE MECHANISM FOR A GAS SOURCE

(75) Inventors: Joshua D. VanHooser, Waterford, MI (US); Dale E. Touchen, Clinton Township, MI (US)

(73) Assignee: TK Holdings Inc., Armada, MI (US)

( * ) Notice: Subject to any disclaimer, the term of this patent is extended or adjusted under 35 U.S.C. 154(b) by 154 days.

(21) Appl. No.: 13/090,774

(22) Filed: Apr. 20, 2011

Related U.S. Application Data

(60) Provisional application No. 61/326,118, filed on Apr. 20, 2010.

(51) Int. Cl.
*B60R 21/26* (2011.01)

(52) U.S. Cl.
USPC ........................................................ 280/737

(58) Field of Classification Search
USPC ................................................. 280/737, 736
See application file for complete search history.

(56) References Cited

U.S. PATENT DOCUMENTS

| | | | | |
|---|---|---|---|---|
| 5,330,730 A * | 7/1994 | Brede et al. | ..................... | 422/305 |
| 5,609,359 A * | 3/1997 | Johnson et al. | ................. | 280/736 |
| 5,609,362 A * | 3/1997 | Sparks et al. | ................. | 280/741 |
| 5,618,057 A * | 4/1997 | Johnson et al. | ................ | 280/736 |
| 5,642,903 A * | 7/1997 | Headley | .......................... | 280/737 |
| 6,726,241 B2 * | 4/2004 | Welz | ............................... | 280/737 |
| 7,520,531 B2 * | 4/2009 | Gammill | ........................ | 280/737 |
| 7,527,290 B2 * | 5/2009 | Blackburn | ..................... | 280/737 |
| 7,527,291 B2 * | 5/2009 | Young et al. | ................... | 280/737 |
| 7,695,010 B2 * | 4/2010 | Perez et al. | .................... | 280/737 |
| 7,806,436 B2 * | 10/2010 | Stevens et al. | ................ | 280/741 |
| 8,011,302 B2 * | 9/2011 | Abaziou | ........................ | 102/530 |
| 8,047,569 B2 * | 11/2011 | Cox et al. | ...................... | 280/736 |
| 2005/0146123 A1 | 7/2005 | Bergmann et al. | ............ | 280/741 |
| 2006/0103123 A1 * | 5/2006 | Myers | ............................ | 280/736 |

* cited by examiner

*Primary Examiner* — Faye M. Fleming
(74) *Attorney, Agent, or Firm* — L.C. Begin & Associates, PLLC

(57) ABSTRACT

A gas source includes a housing with a cavity formed therein, and a connecting passage configured to enable fluid communication between the housing cavity and an exterior of the connecting passage. The connecting passage includes a first end and a second end. A cross-sectional area of the connecting passage second end is less than a cross-sectional area of the passage first end. A seal is configured so as to prevent fluid communication between the connecting passage second-end and the exterior of the connecting passage prior to activation of the gas source. Means are coupled to the housing for providing a pressure wave transmissible via a medium positioned in the cavity to the connecting passage first end.

18 Claims, 5 Drawing Sheets

SEAL RUPTURE MECHANISM FOR A GAS SOURCE

CROSS REFERENCE TO RELATED APPLICATIONS

This application claims the benefit of provisional application Ser. No. 61/326,118, filed on Apr. 20, 2010, the disclosure of which is incorporated herein by reference.

BACKGROUND OF THE INVENTION

The present invention relates to gas sources for supplying gas to an associated gas-actuatable device.

In the field of gas sources for supplying gas to associated gas-actuatable devices, an ongoing need exists for more reliable methods of bursting rupturable seals controlling the gas flow when desired, when the system in which the seal rupture mechanism is incorporated is at a relatively low temperature. A need also exists for methods and devices to help ensure that such seals do not undesirably rupture due to elevated gas pressures resulting from exposure of the gas source to elevated temperatures.

SUMMARY OF THE INVENTION

In one aspect of the embodiments of the present invention, a gas source is provided including a housing with a cavity formed therein, and a connecting passage configured to enable fluid communication between the housing cavity and an exterior of the connecting passage. The connecting passage includes a first end and a second end. A cross-sectional area of the connecting passage second end is less than a cross-sectional area of the passage first end. A seal is configured so as to prevent fluid communication between the connecting passage second-end and the exterior of the connecting passage prior to activation of the gas source. Means are coupled to the housing for providing a pressure wave transmissible via a medium positioned in the cavity to the connecting passage first end.

In another aspect of the embodiments of the present invention, an element is configured for conveying a gas between first and second portions of a gas source. The element includes a passage formed therein. The passage includes a first end and a second end. A cross-sectional area of the passage at the second end is less than a cross-sectional area of the passage at the first end. The element also includes a cavity configured for receiving a seal therein.

BRIEF DESCRIPTION OF THE DRAWINGS

FIG. 3b is a cross-sectional side view of the element shown in FIG. 3a.

FIG. 4b is a cross-sectional side view of the element shown in FIG. 4a.

DETAILED DESCRIPTION

Figure 1:
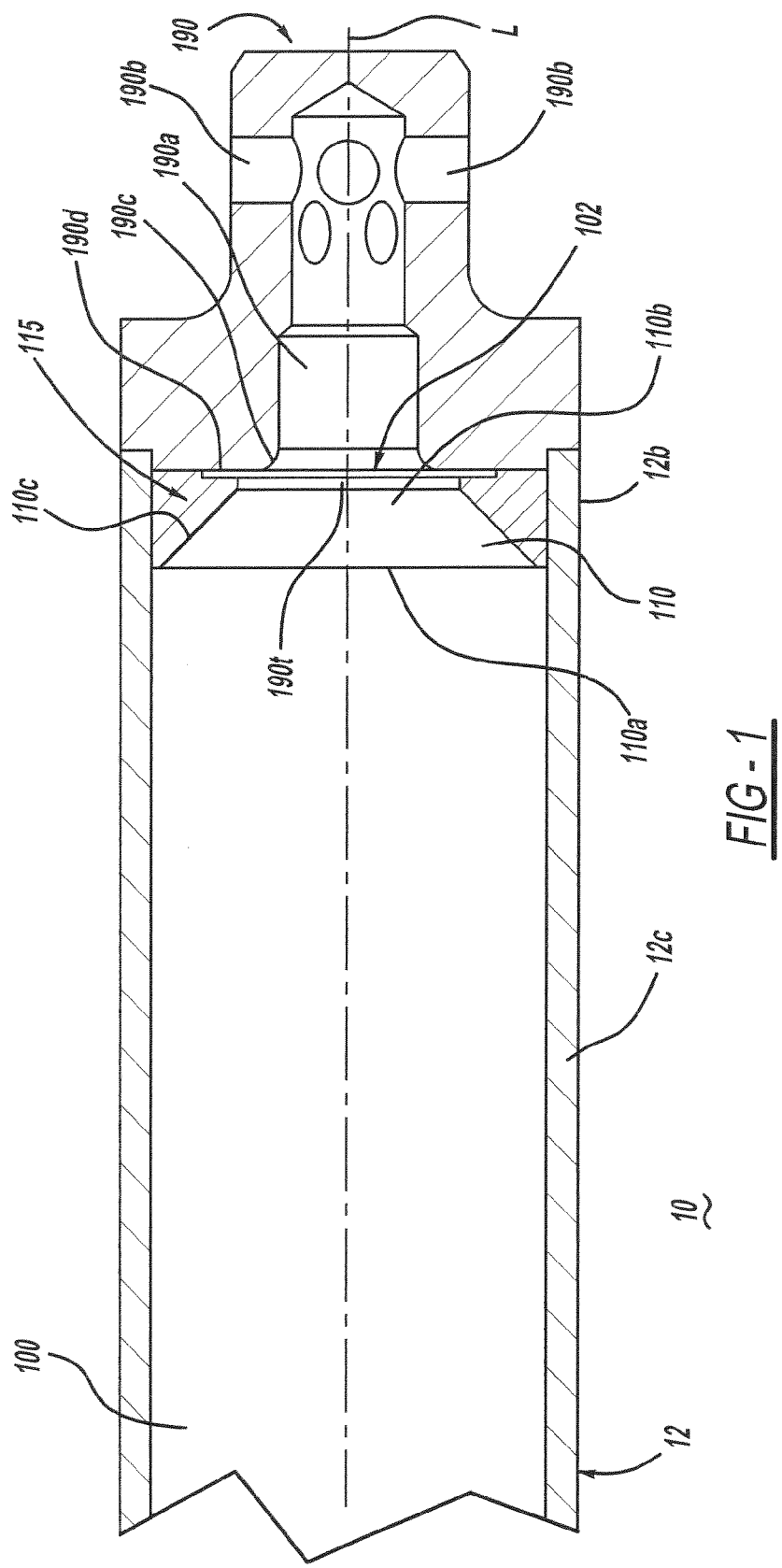
FIG. 1 is a portion of a gas source incorporating a seal rupture mechanism in accordance with a first embodiment of the present invention.

In the descriptions set forth herein, like reference numerals refer to like elements of embodiments of the present invention.

Figure 1A:
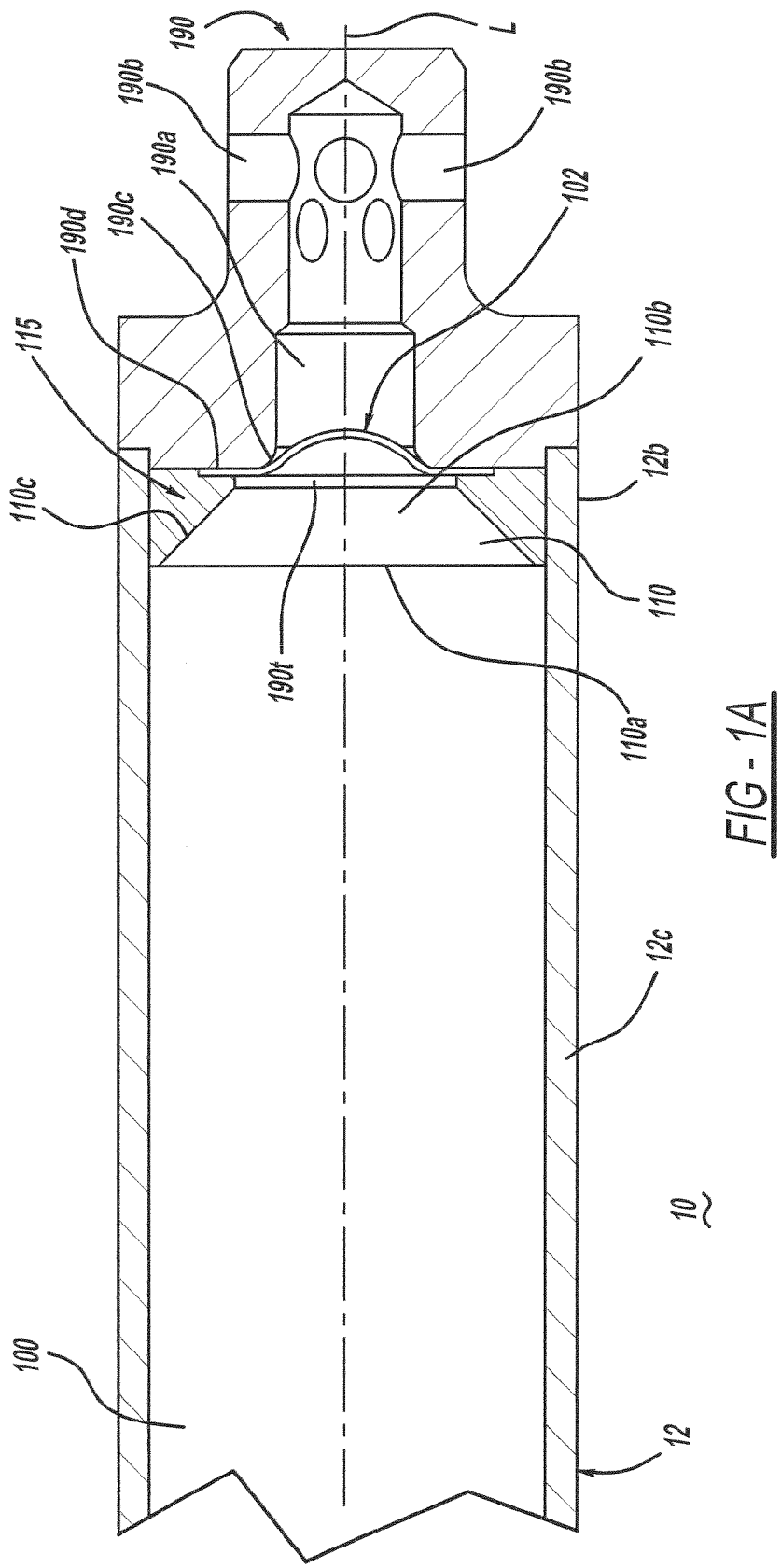
FIG. 1A is a view of the embodiment of FIG. 1 after a pressurized gas has been placed in housing cavity 100, showing the deflection or bulging of a gas-tight seal due to gas pressure prior to actuation of the gas source.
Figure 2:
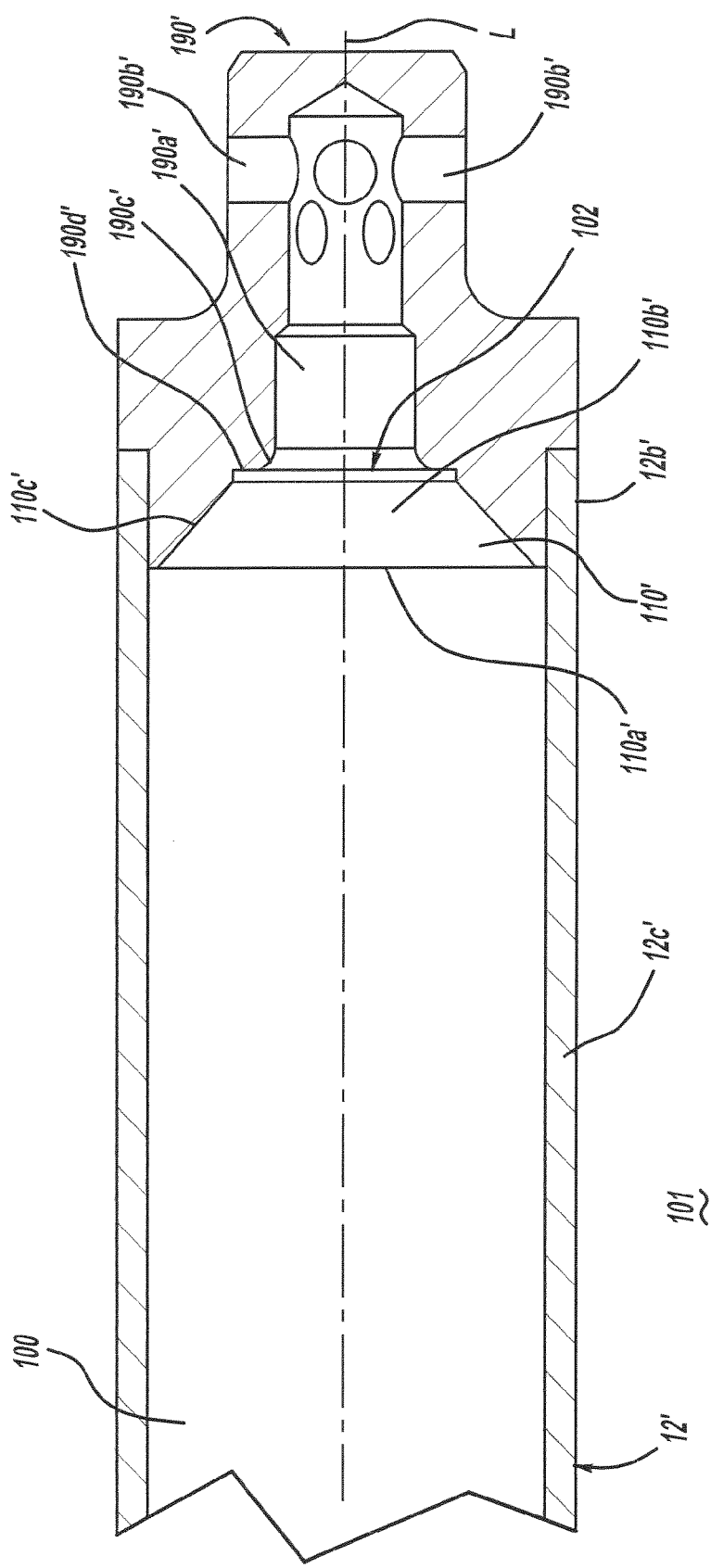
FIG. 2 is a portion of a gas source incorporating a seal rupture mechanism in accordance with a second embodiment of the present invention.

FIGS. 1 and 1A and FIG. 2 show portions of respective embodiments 10, 101 of a gas source usable to provide gas for actuating a gas-actuatable device (not shown) operatively coupled to the gas source. The gas used to actuate the associated device may, for example, be generated by combustion of a gas generant material (not shown) contained in a housing of the gas source, or the gas may be stored in a compressed state within a portion of the gas source (for example, in a chamber or cavity formed in the housing), in a manner known in the art. Alternatively, the gas source may be in the form of, for example, a hybrid inflator, in which both stored gas and gasses generated by combustion of a gas generant material are used to actuate the associated device. The embodiment shown in FIG. 2 is substantially similar to the embodiment shown in FIGS. 1 and 1A except for the differences described herein. However, in the view shown in FIG. 2, the connecting passage 110' (described in greater detail below) is incorporated into end closure 190', while in the embodiment shown in FIGS. 1 and 1A, the connecting passage 110 is incorporated into a part separate from the end closure 190.

Referring to FIGS. 1 and 1A, in one embodiment the gas source 10 includes a substantially cylindrical housing 12 having a first end (not shown), a second end 12b opposite the first end, and a wall 12c extending between the ends to define a housing interior cavity 100. Cavity 100 may define a combustion chamber for containing a combustible gas generant material (not shown) therein, or the cavity may contain a compressed gas. Alternatively, the housing cavity may contain an inner housing or other element (not shown) of the gas source in which gases may be stored and/or generated and then conveyed through a connecting passage to a gas receiving passage 190 formed in an end closure, as described in greater detail below. Housing 12 may be made from a metal, metal alloy, or any other suitable material and may be a cast, stamped, deep-drawn, molded, extruded, or otherwise formed. The gas source 10 may also include filters, one or more initiators, and/or any of a variety of other components that may be incorporated into a conventional gas source or inflator depending on the requirements of a particular application, although for reasons of clarity, such components are not shown in the attached drawings.

Referring to the embodiments shown in FIGS. 1 and 1A and FIG. 2, embodiments of the present invention include an end closure 190, 190' positioned and secured at housing second end 12b for providing a gas-tight seal at housing second end 12b. End closure 190, 190' has a first gas receiving passage 190a, 190a' formed therein. An opening 190c, 190c' formed in end closure 190 enables fluid communication between cavity 100 and a first gas receiving passage 190a, 190a' formed in the end closure. One or more gas exit orifices 190b, 190b' enable fluid communication between passage 190a, 190a' and an exterior of the end closure. Gases exiting the end closure through orifices 190b, 190b' may enter an associated gas actuatable device (not shown) operatively coupled to the gas source 10. As shown in FIGS. 1, 1A, and 2, corners adjacent seals 102, 102' may be radiused to remove any sharp corners that the seals may press against when deflected by gas pressure.

In the embodiments shown in FIGS. 1, 1A and 2, end closure 190, 190' is formed separately from housing 12 and may be attached to housing second end 12b by welding, adhesive attachment, threaded engagement, or any other suitable means, depending on the materials from which the housing and end closure are formed, the operational requirements of a particular application, and other pertinent factors. The end closure 190, 190' is attached to housing 12 so as to form a substantially gas-tight seal between the end closure and the housing. End closure 190, 190' may be forged, machined, molded or otherwise formed from a metallic material, a polymer material, or any other suitable material depending on the requirements of a particular application. Orifice(s) 190b, 190b' may be drilled, punched, molded into the part, or otherwise suitably formed.

Figure 3A:
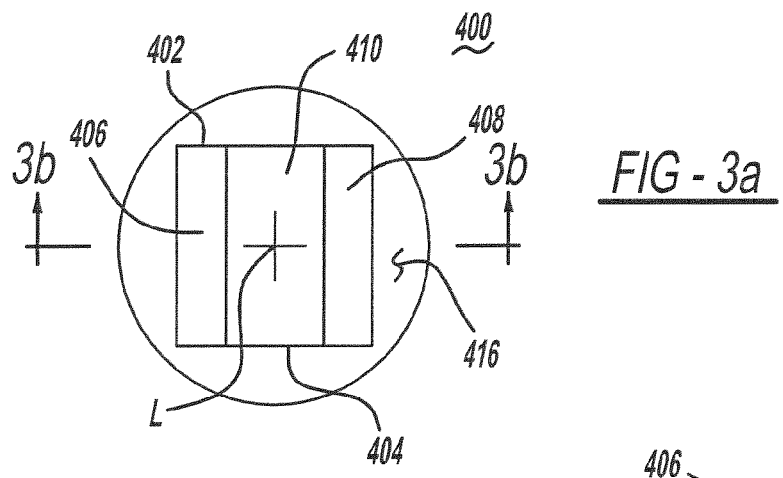
FIG. 3a is a plan view of an element of a seal rupture mechanism incorporating a connecting passage in accordance with another embodiment of the present invention.
Figure 3B:
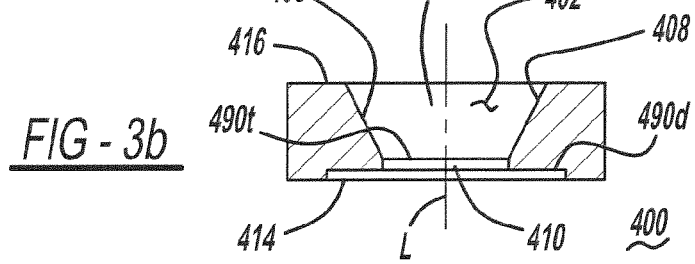

A rupturable, fluid-tight seal 102 may be positioned so as to prevent fluid communication between respective connecting passage second ends 110b, 110b' and their respective associated gas-receiving passage 190a, 190a' prior to activation of the gas source. Seal 102 thus provides a substantially gastight seal between cavity 100 and first gas receiving passage 190a, 190a'. Seal 102 may isolate or seal off cavity 100 to aid in preventing migration of moisture into the cavity in cases where any combustible materials (i.e., a gas generant, auto-ignition material, and/or booster material) are positioned therein. This aids in preventing degradation or contamination of the combustible materials prior to activation of the gas source and rupture of the seal. In a gas source design including a stored gas component, seal 102 may retain the stored gas within cavity 100 prior to activation of the gas source and rupture of the seal. In the embodiment shown in FIGS. 1 and 1A, the seal 102 extends along and is secured to a shoulder (or shoulders) 190d formed (for example, as a countersink) along part 115 into which connecting passage 110 is incorporated. In an alternative embodiment, the seal shown in FIGS. 1 and 1A may be secured to the end closure 190. Referring to FIG. 2, in another embodiment, the seal 102 extends along and is secured in a cavity (such as a countersink) 190d' (or to a shoulder or shoulders) formed along end closure 190'; however, the seal 102 may be mounted to any suitable surface or surfaces. Various known disks, foils, films, tapes, or other suitable materials may be used to form the seal. Cavity 190d' and seal 102 may be configured so that the seal abuts the second end 110b' of the connecting passage when the seal is secured to the end closure, with no space therebetween. Alternatively, a space 190t (not shown) similar to space 490t as shown in FIG. 3b may be provided between connecting passage second end 110b' and cavity seal 102.

Referring again to FIGS. 1 and 1A and FIG. 2, gas sources 10, 101 also include a respective connecting passage 110 (FIGS. 1 and 1A), 110' (FIG. 2) enabling fluid communication between associated cavities 100, 100' and associated gas-receiving passages 190a, 190a' formed in their respective end closures.

In FIGS. 1 and 1A, connecting passage 110, has a first end 110a, proximate, and in fluid communication with, cavity 100. Passage 110, also has a second end 110b, proximate end closure shoulder 190d, along which seal 102 is applied. In FIG. 2, connecting passage 110' has a first end 110a' proximate, and in fluid communication with, cavity 100. Passage 110' also has a second end 110b' proximate end closure shoulder 190d' along which seal 102' is applied.

In the embodiments shown herein, connecting passages 110, 110' are configured so that cross-sectional areas of the passages at their respective second ends 110b, 110b' are less than the cross-sectional areas of the passages at their respective first ends 110a, 110a'.

In various embodiments, to achieve the desired reduction in passage cross-sectional area, passages 110, 110' are provided with walls or wall portions that are tapered or that tend to converge (i.e., that will tend to, if extended far enough, intersect each other in a point or line).

In one particular embodiment (shown in FIGS. 1 and 1A), connecting passage 110 is formed in a separate element or part 115 positioned proximate housing second end 12b between cavity 100 and end closure 190 (described below). In another particular embodiment (shown in FIG. 2), connecting passage 110' is integrated into the structure of the end closure itself. In other embodiments, a connecting passage in accordance with an embodiment of the present invention may be incorporated into the structure of the housing 12 or into the structure of another element of the gas source.

In the particular embodiments seen in FIGS. 1, 1A and 2, the connecting passages 110, 110' have walls 110c, 110c' angled generally radially inwardly in a direction proceeding from first end 110a, 110a' toward second end 110b, 110b' so that the passage has the shape of a conical section. As used herein, the term "conical section" is understood to mean a volume defined by the intersection of a plane with a cone.

In other embodiments, the reduction of the passage cross-sectional area is produced by providing one or more opposed and/or adjacent converging straight walls.

The cross-sectional area of the connecting passage at any given portion of the passage is taken as the area of a plane extending across the passage in a direction perpendicular to the direction of gas flow through the center of that portion of the passage.

In particular embodiments, the connecting passage is bounded by at least one straight wall. This wall tend to converge with another wall bounding the passage, or this wall may extend parallel with another wall bounding the passage and/or parallel with a general direction of gas flow through the passage.

In particular embodiments, the connecting passage may comprise at least a pair of converging walls. FIGS. 3a and 3b show one such embodiment, where opposed walls 406 and 408 tend toward convergence, and opposed walls 402 and 404 extend parallel to each other in the general direction of gas flow through the connecting passage element 400. element 400 also includes a first outer surface 416 and a second outer surface 414 into which a cavity 490d (for example, a countersink) is formed for receiving a seal 102 therein, as previously described. A space 490t as shown in FIG. 3b may be provided between connecting passage second end 410b and cavity 490d, if desired. Alternatively, element 400 may be configured so that the seal abuts the second end of the connecting passage when the seal is secured to the element, with no space therebetween.

Figure 6:
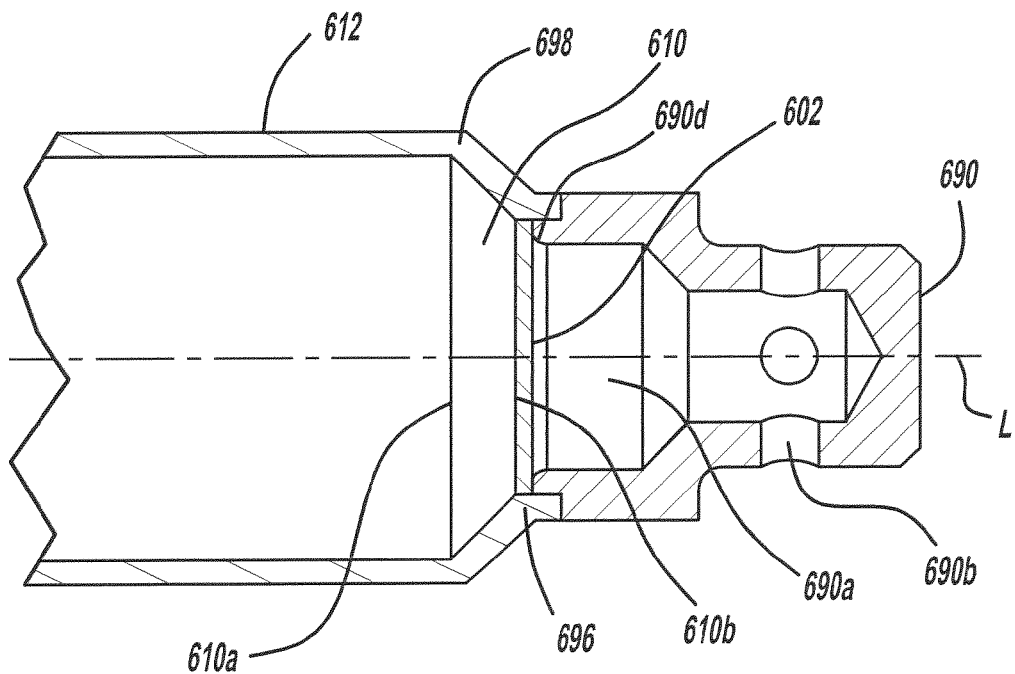
FIG. 6 is a cross-sectional side view of a seal rupture mechanism in accordance with another embodiment of the present invention.

Referring to FIG. 6, in one particular embodiment 601, the connecting passage 610 is formed by a portion of the housing 612. Passage 610 has a first end 610a formed by a first bend 698 in the housing, and a second end 610b formed by a second bend 696. End closure 690 has a gas receiving passage 690a and one or more gas exit orifices 690b formed therein, as previously described with regard to other embodiments. A shoulder 690d is formed along end closure 690 and is configured for securing a seal 602 thereto so as to form a gas-tight seal between housing cavity 600 and connecting passage 610. In the embodiment shown in FIG. 6, seal 602 abuts passage second end 610b. In another embodiment (not shown), the shoulder 690d is spaced apart from second bend 696 so as to provide a space between the second bend and the seal 602 when the seal is secured to the end closure 690.

In one embodiment, the connecting passage first end has an outer diameter in the range of 32 mm to 17 mm. In a particular embodiment, the connecting passage first end has an outer diameter in the range of 24 mm to 25 mm.

In one particular embodiment, at least one connecting passage wall has a slope of 45° with respect to an axis L extending along the center of the passage.

Figure 4A:
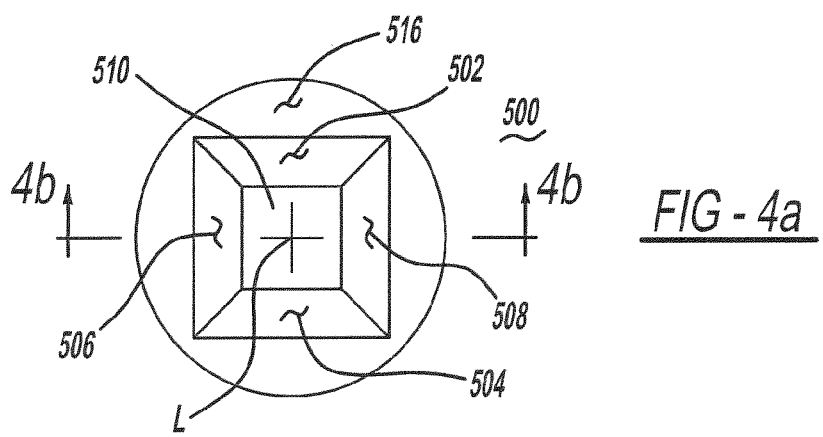
FIG. 4a is a plan view of an element of a seal rupture mechanism incorporating a connecting passage in accordance with another embodiment of the present invention.
Figure 4B:
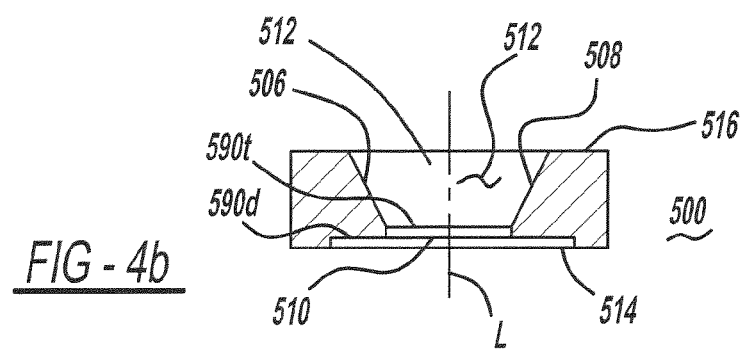

FIGS. 4a and 4b show another embodiment 500 of the connecting passage element including two sets of converging opposed walls 506, 508 and 502, 504. Element 500 also includes a first outer surface 516 and a second outer surface 514 into which a cavity 590d (for example, a countersink) is formed for receiving a seal 102 therein, as previously described. A space 590t as shown in FIG. 4b may be provided between connecting passage second end 510b and cavity 590d, if desired. Alternatively, element 500 may be configured so that the seal abuts the second end of the connecting passage when the seal is secured to the element, with no space therebetween. The embodiment of the connecting passage shown in FIGS. 4a and 4b is in the shape of a pyramidal section (i.e., a passage in the shape of a pyramid intersected by a plane).

In particular embodiments, at least one of the converging walls or wall portions bounding the passage has a constant slope. As used herein, the term "slope" as applied to the passage wall(s) is understood to mean the amount by which the passage wall surface changes location in a direction perpendicular to the general direction of gas flow through the passage for a given distance moved in a direction parallel to the gas flow direction. As used herein, the term "constant slope" as applied to the passage wall(s) is understood to mean that the amount by which the passage wall surface changes location in a direction perpendicular to the general direction of gas flow through the passage is constant for a given distance moved in a direction parallel to the gas flow direction.

Other wall arrangements are also contemplated for reducing the passage cross-sectional area in a direction from passage first ends 110a, 110a' toward respective passage second ends 110b, 110b'.

In one particular embodiment, a cross-sectional area of the gas receiving passage formed in the end closure is less than the cross-sectional area of the connecting passage at the second end. In another particular embodiment, a cross-sectional area of the gas receiving passage formed in the end closure is greater than the cross-sectional area of the connecting passage at the second end. In another particular embodiment, a cross-sectional area of the gas receiving passage formed in the end closure is equal to the cross-sectional area of the connecting passage at the second end.

Generally, in embodiments where the connecting passage is formed in a separate element configured for conveying a gas between first and second portions of the gas source, the element includes a passage formed therein, the passage including a first end and a second end as previously described. A cross-sectional area of the passage at the second end is less than a cross-sectional area of the passage at the first end. The element may further include a cavity (in the form of a countersink, for example) configured for receiving a seal therein.

An element in accordance with one of the embodiments described herein may be incorporated into devices such as a gas source, an airbag system, or a vehicle occupant protection system. In addition, an assembly may be formed including a connecting passage element in accordance with one of the embodiments described herein, and A seal secured within a cavity formed in the element.

The optimum connecting passage dimensions for a particular application may be affected by such factors as the output parameters of an initiator or other pressure wave source, the geometry of the cavity through which the pressure wave travels to reach the connecting passage, the overall dimensional envelope of the gas source, the thickness of the seal, the material(s) from which the seal is formed, and other pertinent factors. Optimum parameters for a given application may be determined experimentally and/or analytically using known methods.

U.S. Pat. No. 7,654,565 and U.S. patent application Ser. No. 11/479,494 (filing date Jun. 30, 2006), both incorporated herein by reference in their entireties, describe examples of gas sources in which a connecting passage 110 in accordance with an embodiment of the present invention may be incorporated.

In operation, activation of the gas source results from receipt by the gas source of an activation signal transmitted to an initiator or other pressure wave-inducing actuation mechanism (not shown) incorporated into or operatively coupled to the to the housing or to the gas source. Examples of suitable pressure wave sources include known suitable pyrotechnic initiators and igniters and known suitable booster and/or gas generant materials. Other pressure wave sources are also contemplated. Activation of the initiator generates a pressure wave which propagates along the interior of housing 12 toward housing second end 12b. The generated pressure wave reaches the end of cavity 100 and enters passage 110, 110'. It is believed that the strength of a pressure wave propagating from the first end of the connecting passage toward the second end of the passage varies inversely with the surface area of the wave. Thus, it is believed that the strength of the wave increases as the wave propagates along a passage having a decreasing cross-sectional area. Therefore, the wave impinging upon the seal will exert a greater rupture force on the seal after having passed through the narrowing connecting passage. This amplification of the wave strength creates a localized region of relatively higher pressure impinging upon the seal 102, effectively enhancing the reliability and effectiveness of the pressure wave as a seal rupture mechanism.

In addition, because the pressure wave is focused near the end of its travel toward the seal, a seal of a given thickness may be ruptured using a relatively weaker initial pressure pulse than would otherwise be the case. This permits a less powerful pressure wave initiation method (for example, a relatively smaller or less powerful pyrotechnic initiator) to be used to generate the pressure pulse.

It will be appreciated that a seal rupture mechanism including a connecting passage in accordance with one of the embodiments described herein may also be used to provide a rupturable seal between a cavity formed in a gas source and a chamber or passage that is not part of an end closure or diffuser. For example, the seal may act to prevent fluid communication between the connecting passage second-end and another element or feature of the gas generating system located exterior of the connecting passage, on a side of the seal opposite the side in fluid communication with the connecting passage. Alternatively, the seal may act to prevent fluid communication between the connecting passage second-end and a gas-actuatable device or other device or feature that is exterior of the connecting passage and that is not a part of the gas source.

Figure 5:
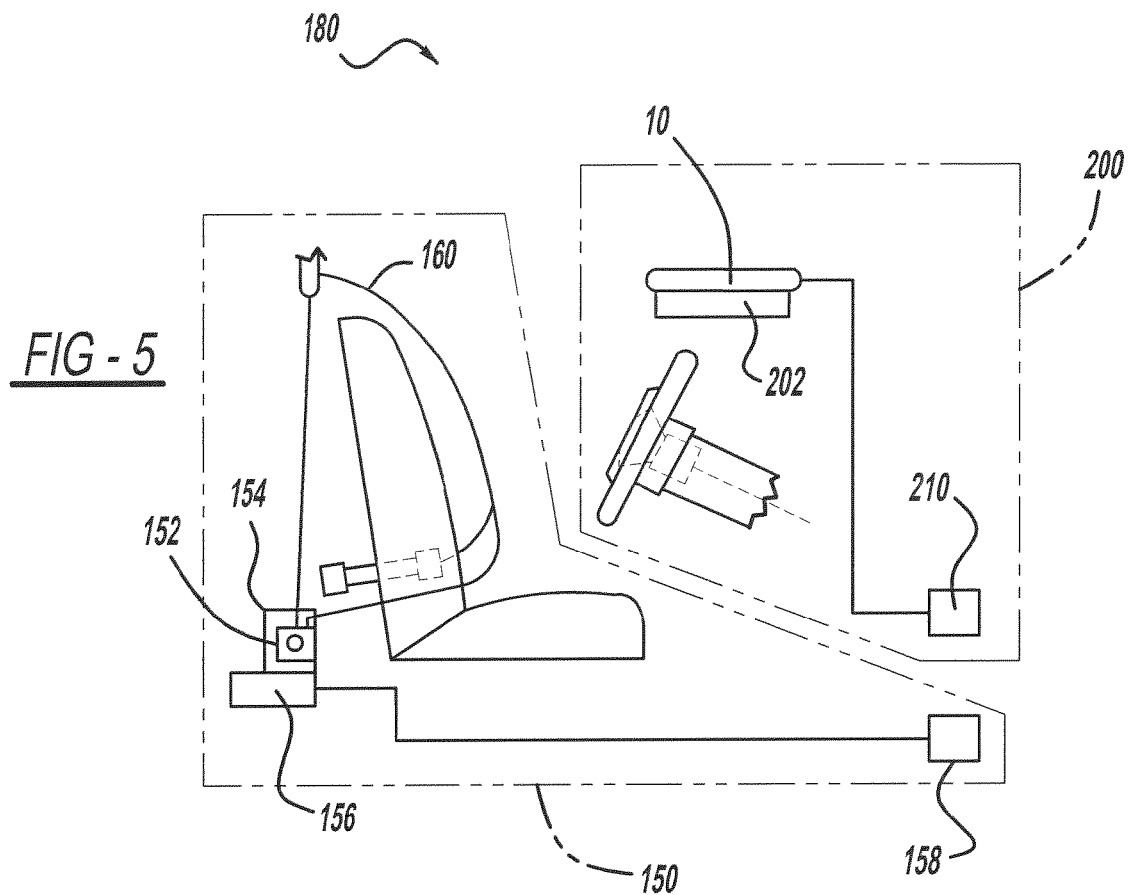
FIG. 5 is a schematic representation of an exemplary vehicle occupant protection system including a gas source incorporating a seal rupture mechanism in accordance with an embodiment of the present invention.

Referring now to FIG. 5, any of the gas source embodiments described herein may be incorporated into an airbag system 200. Airbag system 200 includes at least one airbag 202 and a gas source 10, 101 as described herein coupled to airbag 202 so as to enable fluid communication with an interior of the airbag. Airbag system 200 may also be in communication with a crash event sensor 210 operating in association with a known crash sensor algorithm that signals actuation of airbag system 200 via, for example, activation of airbag gas source 10, 101 in the event of a collision.

Referring again to FIG. 5, a gas source in accordance with an embodiment described herein or an airbag system 200 including such an embodiment may also be incorporated into a broader, more comprehensive vehicle occupant protection system 180 including additional elements such as a safety belt assembly 150. FIG. 5 shows a schematic diagram of one exemplary embodiment of such a protection system. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of suitable pretensioners are described in U.S. Pat. Nos. 6,505,790 and 6,419,177, incorporated herein by reference.

Safety belt system 150 may also be in communication with a crash event sensor 158 (for example, an inertia sensor or an accelerometer) operating in association with a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A gas source comprising:
a housing including a cavity formed therein;
a connecting passage configured to enable fluid communication between the cavity and an exterior of the connecting passage, the connecting passage including a first end and a second end, the second end having a cross-sectional area less than a cross-sectional area of the first end;
a seal configured so as to prevent fluid communication between the connecting passage second end and the exterior of the connecting passage prior to activation of the gas source, and
means coupled to the housing for generating a pressure wave transmissible via a medium positioned in the cavity to the connecting passage first end, then from the first end to the second end,
the gas source further comprising an end closure coupled to the housing, wherein the connecting passage is configured to enable fluid communication between the housing cavity and a gas-receiving passage formed in the end closure, and wherein the seal is configured so as to prevent fluid communication between the connecting passage second end and the gas-receiving passage prior to activation of the gas source, and
wherein a cross-sectional area of the gas receiving passage is greater than the cross-sectional area of the connecting passage at the second end.

2. The gas source of claim 1 wherein the connecting passage comprises at least one straight wall.

3. The gas source of claim 1 wherein the connecting passage comprises a pair of parallel walls.

4. A vehicle occupant protection system comprising a gas source in accordance with claim 1.

5. An airbag system comprising a gas source in accordance with claim 1.

6. The gas source of claim 1 wherein the connecting passage first end has an outer diameter in the range of 32 mm to 17 mm.

7. The gas source of claim 6 wherein the connecting passage first end has an outer diameter in the range of 24 mm to 25 mm.

8. The gas source of claim 6 wherein at least one connecting passage wall has a slope of 45° with respect to an axis extending along the center of the passage.

9. The gas source of claim 1 wherein the connecting passage is formed by a portion of the housing.

10. A gas source comprising:
a housing including a cavity formed therein;
a connecting passage configured to enable fluid communication between the cavity and an exterior of the connecting passage, the connecting passage including a first end and a second end, the second end having a cross-sectional area less than a cross-sectional area of the first end;
a seal configured so as to prevent fluid communication between the connecting passage second end and the exterior of the connecting passage prior to activation of the gas source, and
means coupled to the housing for generating a pressure wave transmissible via a medium positioned in the cavity to the connecting passage first end, then from the first end to the second end,
the gas source further comprising an end closure coupled to the housing, wherein the connecting passage is configured to enable fluid communication between the housing cavity and a gas-receiving passage formed in the end closure, and wherein the seal is configured so as to prevent fluid communication between the connecting passage second end and the gas-receiving passage prior to activation of the gas source, and
wherein a cross-sectional area of the gas receiving passage is equal to the cross-sectional area of the connecting passage at the second end.

11. The gas source of claim 10 wherein the connecting passage is formed in the end closure.

12. The gas source of claim 10 wherein the seal is secured to the end closure.

13. A vehicle occupant protection system comprising a gas source in accordance with claim 10.

14. An airbag system comprising a gas source in accordance with claim 10.

15. The gas source of claim 10 wherein the connecting passage has the shape of a conical section.

16. The gas source of claim 10 wherein the connecting passage comprises at least a pair of converging walls.

17. The gas source of claim 16 wherein at least one of the converging walls has a constant slope.

18. The gas source of claim 10 wherein the connecting passage comprises at least a pair of parallel walls.

* * * * *

UNITED STATES PATENT AND TRADEMARK OFFICE
CERTIFICATE OF CORRECTION

| | | |
|---|---|---|
| PATENT NO. | : 8,602,452 B1 | Page 1 of 1 |
| APPLICATION NO. | : 13/090774 | |
| DATED | : December 10, 2013 | |
| INVENTOR(S) | : VanHooser et al. | |

It is certified that error appears in the above-identified patent and that said Letters Patent is hereby corrected as shown below:

On the Title Page

Item (75) Inventors: The second inventor should read Dale E. Tauchen.

In the Specification

Column 6; Line 29: please delete the first "to the".

Signed and Sealed this
Twenty-ninth Day of April, 2014

Michelle K. Lee
*Deputy Director of the United States Patent and Trademark Office*